United States Patent [19]

Letoffe

[11] Patent Number: 4,672,003
[45] Date of Patent: Jun. 9, 1987

[54] RTV ORGANOPOLYSILOXANE COMPOSITIONS AND SELF-ADHESIVE ELASTOMERS THEREFROM

[75] Inventor: Michel Letoffe, Sainte-Foy-les-Lyon, France

[73] Assignee: Rhone-Poulenc Specialites Chimiques, Courbevoie, France

[21] Appl. No.: 793,321

[22] Filed: Oct. 29, 1985

[30] Foreign Application Priority Data

Oct. 29, 1984 [FR] France .................. 84 16481

[51] Int. Cl.$^4$ ................................. B32B 9/04
[52] U.S. Cl. ...................... 428/447; 528/18; 528/34; 528/33; 528/901; 428/450; 428/452
[58] Field of Search ............ 528/18, 33, 34, 901; 428/447, 450, 452

[56] References Cited

U.S. PATENT DOCUMENTS

| | | | |
|---|---|---|---|
| 3,186,963 | 6/1965 | Lewis et al. | 528/34 |
| 3,801,572 | 4/1974 | Berger. | |
| 3,888,815 | 6/1975 | Bessmer et al. | |
| 4,467,063 | 8/1984 | Lockhart | 528/18 |
| 4,499,234 | 2/1985 | Pratt et al. | 528/18 |
| 4,555,420 | 11/1985 | Lucas | 528/18 |

FOREIGN PATENT DOCUMENTS 58-104275 6/1983 Japan .

Primary Examiner—Melvyn I. Marquis
Attorney, Agent, or Firm—Burns, Doane, Swecker & Mathis

[57] ABSTRACT

Novel RTV organopolysiloxane compositions, advantageously two-component compositions, which are easily vulcanized into self-adhesive elastomers having excellent reversion properties, are comprised of (1) at least one alpha, omega-dihydroxydiorganopolysiloxane polymer having a viscosity of from about 500 to 1,000,000 mPa.s at 25° C., the organic radicals of which being monovalent hydrocarbon radicals, (2) at least one filler material therefor, (3) at least one polyalkoxysilane or polyalkoxysiloxane cross-linking agent therefor, (4) a catalytically effective amount of at least one tin catalyst, and (5) at least one silane having the general formula:

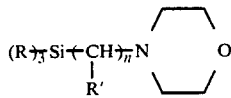

wherein R is an alkyl or alkoxy radical having from 1 to 4 carbon atoms, at least 2 of said radicals R being alkoxy radicals, R' is an alkyl radical having from 1 to 3 carbon atoms, and n is an integer of from 3 to 10.

15 Claims, No Drawings

RTV ORGANOPOLYSILOXANE COMPOSITIONS AND SELF-ADHESIVE ELASTOMERS THEREFROM

BACKGROUND OF THE INVENTION

1. Field of the Invention

The present invention relates to a novel organopolysiloxane composition capable of being vulcanized beginning at ambient or room temperature ("RTV") into an elastomer which is self-adhesive to the most diverse substrates, in particular to glass, wood and plastics such as polyvinylchloride (PVC). More particularly, the present invention relates to novel organopolysiloxane compositions presented in two-component or two-package form prior to use.

2. Description of the Prior Art

Organopolysiloxane compositions which are capable of being vulcanized beginning at ambient temperature are well known to this art and are divided into two separate RTV categories: single-component compositions and two-component or two-package compositions.

Single-component compositions cross-link when they are exposed to atmospheric moisture, typically in the absence of catalysts.

Contrariwise, two-component compositions are marketed and stored in the form of two separate components, a first component containing the polymeric base materials and the second component containing a catalyst. The two components are mixed extemporaneously at the time of use and the mixture cross-links into the form of a relatively hard elastomer.

These two-component compositions are well known to the art and are described, in particular, in the text by Walter Noll, *Chemistry and Technology of Silicones*, 2nd edition, pages 395 to 398 (1968) and in U.S. Pat. No. 2,843,555.

Such compositions incorporate essentially four (4) different ingredients:

(i) a diorganopolysiloxane having silanol end groups;
(ii) a cross-linking agent, typically a silicate or a polysilicate;
(iii) a tin catalyst; and
(iv) a filler.

Compared to the single-component compositions, the two-component compositions have the advantage of being less costly.

For some applications, they are easier to handle and can be cast, molded and cross-linked in situ at ambient temperature. However, they have the disadvantage of poorly adhering to various substrates such as glass, metals, wood, plastics, concrete, and the like. To overcome this disadvantage it has already been proposed to this art to apply, beforehand, to the substrates an adhesive primer layer to which, after drying, the organosiloxane composition is applied. Usual primers are, for example, a mixture of an alkoxysilane and a resin in organic solution. The use of these primers makes it necessary, however, to apply an additional material, which increases the overall costs.

Self-adhesive, two-component, organopolysiloxane compositions incorporating silanes containing an amine function have also been proposed to this art, in U.S. Pat. Nos. 3,801,572 and 3,888,815.

These silanes containing an amine function are broadly outlined. However, the prior art does not present the problem of, nor does it propose a solution to, providing a self-adhesive organopolysiloxane composition in two-component form which possesses the following desirable properties at the same time:

(a) marked adhesion to the most widely diverse substrates and particularly glass, metals, in particular aluminum, and plastics, in particular PVC, etc.;

(b) good "reversion" behavior. In fact, when these known elastomers of the above type are subjected to heating immediately or shortly after their preparation, for example 24 hours after the mixing of the diorganopolysiloxane, the cross-linking agent and the tin, a phenomenon referred to by those skilled in this art as "reversion" is frequently encountered, beginning in the middle of the cross-section of the elastomers. During this heating, the elastomers liquefy or soften internally, although most of the time they remain solid on their external surfaces; nevertheless, the relatively thin layer which remains under these conditions is frequently sticky. This "reversion" can already be produced at temperatures above 80° C. However, in the majority of cases it is produced at temperatures above 100° C., and it is particularly marked when the elastomers are heated in the total or virtual absence of air, that is to say, when the heated elastomers are in a partly or wholly closed system when being heated. Consequently, this "reversion" constitutes a very inconvenient disadvantage, in particular in certain applications in which the hardened elastomers are heated after cross-linking;

(c) complete and uniform cross-linking of the composition throughout its bulk at ambient temperature; and (d) a rapid surface set.

SUMMARY OF THE INVENTION

Accordingly, a major object of the present invention is the provision of an improved class of organopolysiloxane compositions capable of being vulcanized beginning at ambient temperature, and which novel RTV organopolysiloxanes display those properties heretofore recognized as desiderata in this art.

Briefly, the novel organopolysiloxanes according to the present invention comprise:

(1) at least one alpha, omega-dihydroxydiorganopolysiloxane polymer having a viscosity of from 500 to 1,000,000 mPa.s at 25° C., the organic radicals of which are monovalent hydrocarbon radicals;

(2) at least one filler;

(3) at least one cross-linking agent selected from among:

(3a) the polyalkoxysilanes of the formula:

$$(R_1O)_a Si(R_2)_{4-a} \quad (Ia)$$

in which a is 3 or 4, $R_1$ and $R_2$, which are identical or different, are each a monovalent hydrocarbon radical containing up to 8 carbon atoms, with the proviso that $R_1$ may also be a radical $R_3OR_1$ in which $R_3$ is a divalent hydrocarbon radical containing up to 6 carbon atoms and $R_1$ is otherwise as defined above;

(3b) the polyalkoxysiloxanes containing at least two alkoxy radicals bonded to a silicon atom per molecule, in which the silicon atoms are joined by Si-O-Si bonds, the other valencies of the silicon atoms being satisfied by radicals $R_1O$ or $R_2$, with $R_1$ and $R_2$ being as defined above;

(4) a catalytically effective amount of at least one catalytic tin compound; and (5) at least one silane of the formula:

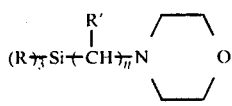

in which the radical R is an alkyl or alkoxy radical containing from 1 to 4 carbon atoms inclusive, at least two of the radicals R being alkoxy, R' is an alkyl radical containing from 1 to 3 carbon atoms inclusive and n is an integer from 3 to 10 inclusive, and preferably wherein n=3, R'=H and R=methoxy or ethoxy.

In the description which follows, all parts and percentages are given by weight, unless specified otherwise.

DETAILED DESCRIPTION OF THE INVENTION

More particularly according to the present invention, the subject novel organopolysiloxanes advantageously comprise, per 100 parts of (1), of 5 to 80 parts of (2), of 0.5 to 15 parts of (3), of 0.005 to 1 part, preferably of 0.01 to 0.5 part of (4), calculated as the weight of tin metal, and 0.5 to 10 parts of (5).

The alpha, omega-dihydroxydiorganopolysiloxane polymers (1) employed in the composition of the invention have a viscosity of from 500 to 1,000,000 mPa.s at 25° C., preferably 800 to 500,000 mPa.s at 25° C.; they principally consist of diorganosiloxyl moieties, but the presence of other moieties, such as monoorganosiloxyl, is not excluded in a proportion of at most 2% on a numerical basis.

Exemplary of the organic radicals which are bonded to the silicon atoms of these polymers, those of the following types are representative:

(i) alkyl radicals containing from 1 to 4 carbon atoms, such as methyl, ethyl or propyl radicals;

(ii) haloalkyl radicals containing from 3 to 4 carbon atoms, such as 3,3,3-trifluoropropyl or 4,4,4-trifluorobutyl radicals;

(iii) aryl radicals containing from 6 to 8 carbon atoms, such as phenyl, tolyl or xylyl radicals;

(iv) haloaryl radicals containing from 6 to 7 carbon atoms, such as chlorophenyl, dichlorophenyl, trichlorophenyl, tetrachlorophenyl or trifluoromethylphenyl radicals; and (v) cyanoalkyl radicals containing from 3 to 4 carbon atoms, such as beta-cyanoethyl or gamma-cyanopropyl radicals.

The methyl radicals constitute at least 60%, preferably 75%, of the total amount of such organic radicals.

Various methods exist for preparing these polymers (1), but typically used are those which have been proven industrially, for example, the polymerization of diorganocyclopolysiloxanes with the aid of a catalytic amount of an alkaline or acidic agent, followed by treatment of the polymerizates with calculated quantities of water (French Pat. Nos. 1,134,005 and 1,198,749); in addition, they may be directly obtained from the silicone producers.

Conventional fillers (2) are used to impart acceptable mechanical properties to the elastomers resulting from the setting of the compositions of the invention. They are typically incorporated, as mentioned earlier, in a proportion from 5 to 80 parts, preferably 20 to 60 parts, per 100 parts of polymer (1) and are advantageously selected from among the following materials:

(i) inorganic material such as pyrogenic silica, precipitated silica, diatoms, ground quartz, aluminum silicates, mixed aluminum and magnesium silicates, zirconium silicate, mica powder, calcium carbonate, glass powder and fibers, titanium oxide of the pyrogenic oxide and rutile type, barium zirconate, barium sulfate, barium metaborate, boron nitride, lithopone; iron, zinc, aluminum, zirconium and magnesium oxides, graphite, conductive or nonconductive lampblacks, asbestos, or calcined clay;

(ii) organic material such as phthalocyanines, cork powder, wood sawdust, synthetic fibers or synthetic polymers (polytetrafluoroethylene, polyethylene, polypropylene, polystyrene, polyvinyl chloride).

These fillers, and in particular the fillers of inorganic origin, may be surface-modified, if appropriate, by treatment with the organosilicon compounds usually employed for this purpose, such as diorganocyclopolysiloxanes, hexaorganodisiloxanes, hexamethyldisilazane, and diorganocyclopolysilazanes (French Pat. Nos. 1,136,884, 1,136,885, 1,236,505, British Pat. No. 1,024,234). These fillers, modified in this manner in the majority of cases contain from 3 to 30% of their weight of organosilicon compounds.

The cross-linking agents (3) employed, as mentioned earlier, in a proportion of at most 15 parts, preferably at most 7 parts, per 100 parts of polymer (1), are used principally to cross-link the composition.

The cross-linking agents (3) are well known to this art and are described particularly in French Pat. Nos. 1,330,625, 2,121,289, 2,121,631 and 2,458,572.

The $R_1$ and $R_2$ monovalent hydrocarbon radicals thereof, are advantageously alkyl, alkenyl, alkoxyalkyl, phenyl, alkylphenyl and phenylalkyl radicals, optionally substituted by a halogen atom.

Representative, for example, are the silanes of formula:

$CH_3Si(OCH_3)_3$ $CH_3Si(OCH_2CH_3)_3$ $CH_3Si(OCH_2CH_2OCH_3)_3$ $Si(OCH_2CH_2OCH_3)_4$ $Si(OCH_3)_4$ $Si(OCH_2CH_3)_4$ $CH_2\!\!=\!\!CHSi(OCH_2CH_2OCH_3)_3$ $C_6H_5Si(OCH_3)_3$ $C_6H_5Si(OCH_2CH_2OCH_3)_3$ $CH_3Si(OCH_3)_3$
$CH_3Si(OCH_2CH_3)_3$
$CH_3Si(OCH_2CH_2OCH_3)_3$
$Si(OCH_2CH_2OCH_3)_4$
$Si(OCH_3)_4$
$Si(OCH_2CH_3)_4$
$CH_2\!\!=\!\!CHSi(OCH_2CH_2OCH_3)_3$
$C_6H_5Si(OCH_3)_3$
$C_6H_5Si(OCH_2CH_2OCH_3)_3$ $CH_3Si(OCH_2\!-\!\!\underset{\underset{CH_3}{|}}{CH}\!\!-\!OCH_3)_3$ Among the cross-linking agents (3), preferred alkyltrialkoxysilanes, alkyl silicates and alkylpolysilicates in which the organic radicals are alkyl radicals containing from 1 to 4 carbon atoms.

Exemplary alkyl silicates are methyl silicate, ethyl silicate, isopropyl silicate, n-propyl silicate, and representative polysilicates are the products of partial hydrolysis of these silicates; these are polymers consisting of a high proportion of moieties of the formula $(R^4O)_2SiO$ and a small proportion of moieties of the formula $(R^4O)_3SiO_{0.5}$, $R^4OSiO_{1.5}$ and $SiO_2$; the symbol $R^4$ denoting the methyl, ethyl, isopropyl or n-propyl radicals. Their characterization is usually based on their silica content which is established by determining the product of total hydrolysis of a sample.

Methods for the preparation thereof are well known and are described, in particular, in the aforenoted text *Chemistry and Technology of Silicones* by W. Noll, on pages 648 to 659. In order to be compatible and/or reactive with the other ingredients employed in the preparation of the compositions of the invention, these polymers must dissolve in the usual hydrocarbon solvents, such as toluene, xylene and methylcyclohexane, in a proportion of at least 50 parts of polymers per 100 parts of solvents.

A partially hydrolyzed ethyl silicate marketed under the trademark "Ethyl Silicate-40" by Union Carbide Corporation can be employed, in particular, as a polysilicate.

The compound (4) is a catalytic tin compound for catalyzing the cross-linking of this type of composition, and, in particular, may be a tin salt of a mono- or dicarboxylic acid. These tin carboxylates are also described in the Noll text (*Chemistry and Technology of Silicones*, page 337, Academic Press, 1968, 2nd edition). Exemplary are, in particular, dibutyl tin naphthenate, octanoate, oleate, butyrate and dilaurate and dibutyl tin diacetate.

Salts of monocarboxylic acids branched on an aliphatic carbon atom in the alpha position relative to the carboxyl group and containing at least 8 carbon atoms per molecule can also be used, such as those described in French Pat. No. 2,066,159, in particular dibutyl tin diversatate.

Use can also be made, as a catalytic tin compound, of the product of reaction of a tin salt, in particular a tin dicarboxylate, with ethyl polysilicate, as described in U.S. Pat. No. 3,186,963. It is also possible to use the product of reaction of a dialkyldialkoxysilane with a tin carboxylate, as described in U.S. Pat. No. 3,862,919.

It is also possible to use the product of reaction of an alkyl silicate or of an alkyl trialkoxysilane with dibutyltin diacetate, as described in Belgian Pat. No. 842,305.

Finally, a tetravalent tin chelate can be used, as described in published French Patent Application No. 83/20913, filed Dec. 28, 1983 and assigned to the assignee hereof, and in particular the chelates of the formula:

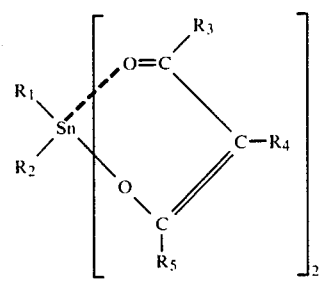

(II)

in which the radicals $R_1$ and $R_2$, which are identical or different, are each a $C_1-C_{12}$ alkyl radical, a $C_1-C_{12}$ alkoxy radical, a $C_2-C_{12}$ alkenyl radical, a $C_1-C_{12}$ acyl radical, A $C_1-C_6$ acyloxy radical, an optionally halogenated $C_5-C_8$ cycloalkyl radical, an optionally halogenated mononuclear aryl radical, a mononuclear arylalkyl radical in which the alkyl moiety is $C_1-C_4$ ($R_1$ and $R_2$ being other than the hydrogen atom); $R_3$ and $R_5$, which are identical or different, are each a hydrogen atom, a radical containing at most approximately 8 carbon atoms, selected from among alkyl, haloalkyl, cyanatoalkyl, alkoxy, haloalkoxy and cyanoalkoxy radicals, optionally halogenated mononuclear aryl radicals and optionally halogenated mononuclear arylalkyl radicals in which the alkyl moiety is $C_1-C_4$; and $R_4$ is the hydrogen atom, a radical containing at most approximately 8 carbon atoms, selected from among alkyl, haloalkyl and aryl radicals, with the proviso that $R_4$ and $R_5$ may together form a cyclic hydrocarbon radical containing at most 12 carbon atoms and optionally substituted by chloro, nitro and cyano radicals.

Tin chelates are known materials, the preparation of which is described, for example, in U.S. Pat. No. 3,055,845.

As examples of hexacoordinated tetravalent tin chelates, representative are the following:

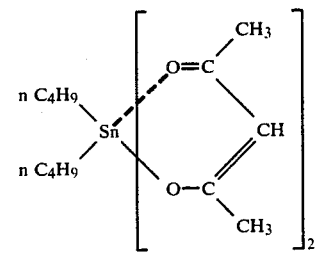

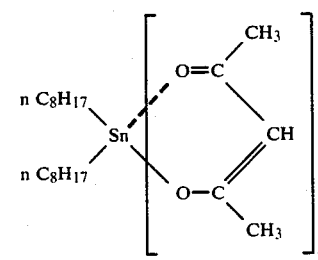

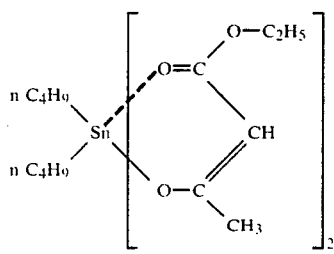

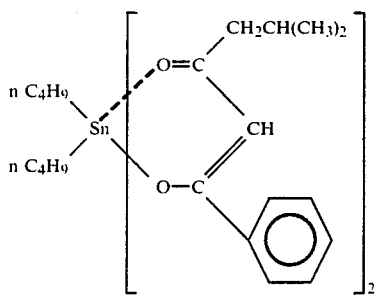

In addition to the fillers, various adjuvants (6) may be added to the composition of the invention, such as inorganic or organic pigments and organosilicon polymers. The latter, which act as plasticizers, stabilizers, thixotropic agents or agents which promote extrusion of the compositions, are employed in a proportion of at most 70 parts, preferably at most 60 parts, per 100 parts of polymers (1). They are selected from among:

(i) alpha, omega-bis(triorganosiloxy)diorganopolysiloxane polymers having a viscosity of at least 10 mPa.s at 25° C., consisting principally of diorganosiloxyl moieties and at most 1% of monoorganosiloxyl moieties, the organic radicals bonded to the silicon atoms being methyl, vinyl, or phenyl radicals, at least 60% of these organic radicals being methyl radicals. The viscosity of these polymers may reach several tens of millions of mPa.s at 25° C.; and they consequently include oils of fluid to viscous appearance and soft to hard gums. They are prepared according to the usual methods described in greater detail in French Pat. Nos. 978,058, 1,025,150 and 1,108,764;

(ii) branched, liquid methylpolysiloxane polymers containing from 1.6 to 1.99 organic groups per silicon atom, consisting of moieties of formulae $(CH_3)_3SiO_{0.5}$, $(CH_3)_2SiO$ and $CH_3SiO_{1.5}$ and containing from 0.3 to 6% of hydroxyl groups. They may be prepared by hydrolysis of the corresponding chlorosilanes, as described in French Pat. No. 1,408,662; and (iii) diorganopolysiloxane oils blocked by hydroxyl and/or lower alkoxy groups, having a low viscosity, generally in the range of 2 to 2000 mPa.s at 25° C., the organic radicals bonded to the silicon atoms being, as previously, methyl, vinyl, or phenyl radicals, at least 40% of these organic radicals being methyl radicals; as chain-blocking lower alkoxyl groups, exemplary are methoxy, ethoxy, isopropoxy, propoxy, butoxy, isobutoxy, and tert-butoxy groups. These oils are also prepared according to the usual methods described in greater detail in French Pat. Nos. 938,292, 1,014,674, 1,116,196, 1,278,281 and 1,276,619.

The compound (5) is a silane of the formula:

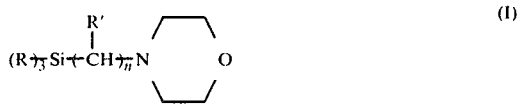

with R, R' and n being as defined above and preferably n=3, R'=H and R is an alkoxy radical.

The products of formula (I) are generally known compounds.

In particular, N-(3-trimethoxysilylpropyl)morpholine and the process for preparing it are described by John L. Speier, *J. Org. Chem.*, 36, No. 21, p. 3120 (1971).

In cases where the compounds of formula (I) are novel, they are easily prepared, for example, by reaction under reflux of the corresponding gamma-chlorosilane of the formula (III):

in which R, R' and n are as defined above, with, preferably a molar excess of morpholine, at a temperature of from 100° and 150° C.

It will of course be appreciated that the silanes (5) according to the invention are conspicuously absent from the aforementioned U.S. Pat. Nos. 3,801,572 and 3,888,815. Moreover, these two patents are completely silent as regards the choice of a silane which imparts to the final organopolysiloxane composition both, in particular, good reversion behavior and good adhesion to various substrates, whatever the tin catalyst employed.

If the organopolysiloxane composition is not utilized within about 10 minutes, it is stored in 2-component form.

The first component may contain the compounds (1) and (2) and, if appropriate, the various adjuvants (6); the second component may contain the compounds (3), (4) and (5).

When it is intended to produce a composition capable of being vulcanized at ambient temperature, the 2 components are mixed to produce a composition which is spread, molded or laminated, depending upon the intended use. At the end of a period of time of between 15 and 40 minutes, the composition has set sufficiently to retain its final shape. After approximately 5 hours the composition has set homogeneously until it attains 70% of its final Shore A hardness.

As will hereinafter be seen, the subject compositions display a remarkable reversion behavior.

The compositions of the invention may be employed in many fields, such as:

(i) gluing the most varied materials such as metals, wood, masonry, ceramics, plastics, glass, glass cloth/organic resin laminates, organic and synthetic rubbers, asbestos, woven or non-woven products based on inorganic, organic or synthetic fibers;

(ii) the manufacture of molds for reproducing sculpted articles of a complex shape, such as period furniture and motor vehicle dashboards;

(iii) the protection of connections in electronics and electrical engineering; and (iv) jointing for vehicle windscreens, double glazing and sanitary installations.

In order to further illustrate the present invention and the advantages thereof, the following specific examples are given, it being understood that same are intended only as illustrative and in nowise limitative.

EXAMPLE 1

A polysiloxane composition P was prepared by mixing:

(i) 300 parts of an alpha,omega-dihydroxypolydimethylsiloxane oil having a viscosity of 60,000 mPa s at 25° C.;

(ii) 300 parts of a dimethylsiloxane oil blocked at each end by a trimethylsiloxy group, having a viscosity of 20 mPa.s at 25° C.; and (iii) 390 parts of ground quartz of a particle size distribution of from 0.5 and 10 microns, and 400 ppm of water.

To 100 g of composition P were added 0.8 g of ethyl polysilicate as a cross-linking agent, 4 different tin metal catalytic compounds, and an aminosilane according to the invention.

The compositions obtained were cast in a cylindrical capsule 1 centimeter in height and with a cross-section diameter of 1 centimeter and the setting time of the two specimens was measured, together with the Shore A hardness (ASTM standard D 2240) initially at ambient temperature, and after several days, while the specimen was maintained at 120° C., to evaluate the reversion behavior. This hardness was measured on the surface and within the specimen internally.

The results obtained are reported in Table I below.

EXAMPLE 2 (COMPARATIVE)

The procedure as in Example 1 was repeated, except that the aminosilane of the invention was replaced by various known silanes.

The results are reported in Table II below.

In Tables I and II the following designations appear:
+: correct adhesion
o : poor or no adhesion
A : dibutyltin dilaurate
B : dibutyltin diversatate
C : product of a reaction, for 8 hr at 120° C., of 20 parts of dibutyltin dilaurate with 60 g of ethyl polysilicate according to U.S. Pat. No. 3,186,963.
D : dibutyltin bis(acetylacetonate)
CAT : catalyst: nature of the catalyst (A, B, C or D) and quantity in g of the tin catalytic compound per 100 g of P.

TABLE I

| SILANE | | | | SHORE A HARDNESS | | | ADHESION | | |
|---|---|---|---|---|---|---|---|---|---|
| nature | quantity (in g) per 100 g of P | CAT. | surface set time | initial | 2 days at 120° C. | 5 days at 120° C. | glass | Al | PVC |
| $(CH_3O)_3Si(CH_2)_3N\langle morpholino \rangle$ | 2.0 | A:0.2 | 17 min | 17 | 6 | 5 | + | + | + |
| " | " | B:0.2 | 40 min | 16 | 7 | 3 | + | + | + |
| " | " | C:0.4 | 35 min | 16 | 12 | 9 | + | + | + |
| " | " | D:0.1 | 25 min | 16 | 8 | 6 | + | + | + |
| $(C_2H_5O)_3Si(CH_2)_3N\langle morpholino \rangle$ | 2.0 | A:0.2 | 1 hr | 18 | 9 | 4 | + | + | + |
| " | " | B:0.2 | 1 hr 40 min | 18 | 10 | 5 | + | + | + |
| " | " | C:0.4 | 1 hr 5 min | 20 | 15 | 10 | + | + | + |
| " | " | D:0.1 | 25 min | 19 | 11 | 6 | + | + | + |

TABLE II

| SILANE | | | | SHORE A HARDNESS | | | ADHESION | | |
|---|---|---|---|---|---|---|---|---|---|
| nature | quantity (in g) per 100 g of P | CAT. | Surface set time | initial | 2 days at 120° C. | 5 days at 120° C. | glass | Al | PVC |
| $(CH_3O)_3Si(CH_2)_3NH_2$ | 2.0 | A: 0.2 | 2 min | 2 | 0 | 0 | + | + | + |
| $(CH_3O)_3Si(CH_2)_3NH_2$ | " | B: 0.2 | 5 min | 3 | 0 | 0 | + | + | + |
| $(CH_3O)_3Si(CH_2)_3NH_2$ | " | C: 0.4 | 3 min | 2 | 0 | 0 | + | + | + |
| $(CH_3O)_3Si(CH_2)_3NH_2$ | " | D: 0.1 | 3 min | 2 | 0 | 0 | + | + | + |
| $(CH_3O)_3Si(CH_2)_3-NH(CH_2)_2NH_2$ | 2.0 | A: 0.2 | 5 min | 2 | 0 | 0 | + | + | + |
| $(CH_3O)_3Si(CH_2)_3-NH(CH_2)_2NH_2$ | " | B: 0.2 | 3 min | 3 | 0 | 0 | + | + | + |
| $(CH_3O)_3Si(CH_2)_3-NH(CH_2)_2NH_2$ | " | C: 0.4 | 4 min | 2 | 0 | 0 | + | + | + |
| $(CH_3O)_3Si(CH_2)_3-NH(CH_2)_2NH_2$ | " | D: 0.1 | 3 min | 4 | 0 | 0 | + | + | + |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. An RTV organopolysiloxane composition of matter comprising (1) at least one alpha,omega-dihydroxydiorganopolysiloxane polymer having a viscosity of from about 500 to 1,000,000 mPa.s at 25° C., the organic radicals of which being monovalent hydrocarbon radicals, (2) at least one filler material therefor, (3) at least one polyalkoxysilane or polyalkoxysiloxane cross-linking agent therefor, (4) a catalytically effective amount of at least one tin crosslinking catalyst, and (5) at least one silane having the general formula:

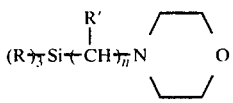  (I)

wherein R is an alkyl or alkoxy radical having from 1 to 4 carbon atoms, at least 2 of said radicals R being alkoxy radicals, R' is hydrogen or an alkyl radical having from 1 to 3 carbon atoms, and n is an integer of from 3 to 10.

2. The RTV organopolysiloxane composition as defined by claim 1, wherein said at least one silane (5), R' is hydrogen, R is methoxy or ethoxy, and n is 3.

3. The RTV organopolysiloxane composition as defined by claim 2, wherein said at least one silane (5) has the formula:

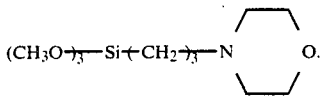

4. The RTV organopolysiloxane comnosition as defined by claim 2, wherein said at least one silane (5) has the formula:

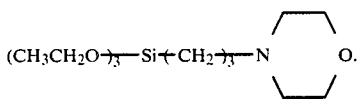

5. The RTV organopolysiloxane composition as defined by claim 1. wherein said at least one cross-linking agent (3) comprises (3a) a polyalkoxysilane having the formula:

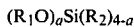

wherein a is 3 or 4, and $R_1$ and $R_2$, which may be an identical or different monovalent hydrocarbon radical having up to 8 carbon atoms, additionally in that $R_1$ may be $R_3OR_4$ in which $R_3$ is a divalent hydrocarbon radical having up to 6 carbon atoms, with $R_4$ being a monovalent hydrocarbon radical having up to 8 carbon atoms, or (3b) a polyalkoxysiloxane containing at least two alkoxy radicals bonded to a silicon atom per molecule, in which the silicon atoms are bonded by Si-O-Si bonds, the other valencies of said silicon atoms being satisfied by $R_1O$ or $R_2$ radicals, with $R_1$ and $R_2$ being as defined above.

6. The RTV organopolysiloxane composition as defined by claim 1, wherein said at least one cross-linking agent (3) comprises an alkyl silicate, or alkyl polysilicate, the alkyl radicals of which having from 1 to 4 carbon atoms.

7. The RTV organopolysiloxane composition as defined by claim 1, comprising, per 100 parts of (1), 5 to 80 parts of (2), 0.5 to 15 parts of (3), 0.005 to 1 part of (4), calculated as the weight of tin metal, and from 0.5 to 10 parts of (5).

8. The RTV organopolysiloxane composition as defined by claim 1, wherein said at least one tin catalyst (4) comprises a compound of the formula:

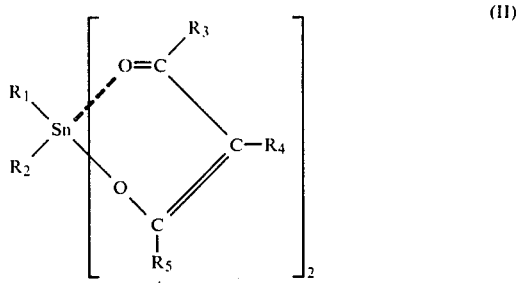  (II)

in which $R_1$ and $R_2$, which are identical or different, are each a $C_1$–$C_{12}$ alkyl radical, a $C_1$–$C_{12}$ alkoxy radical, a $C_2$–$C_{12}$ alkenyl radical, a $C_1$–$C_{12}$ acyl radical, a $C_1$–$C_6$ acyloxy radical, an optionally halogenated $C_5$–$C_8$ cycloalkyl radical, an optionally halogenated mononuclear aryl radical, or a mononuclear arylalkyl radical, the alkyl moiety of which being $C_1$–$C_4$; $R_3$ and $R_5$, which are identical or different are each hydrogen, or an alkyl, haloalkyl, cyanatoalkyl, alkoxy, haloalkoxy, cyanoalkoxy, optionally halogenated mononuclear aryl, or an optionally halogenated mononuclear arylalkyl radical, the alkyl moiety of which being $C_1$–$C_4$; and $R_4$ is hydrogen, or an alkyl, haloalkyl or aryl radical, with the proviso that $R_4$ and $R_5$ may together form a cyclic hydrocarbon radical containing up to 12 carbon atoms and optionally substituted by chloro, nitro and cyano radicals.

9. The RTV organopolysiloxane composition as defined by claim 1, in two-component form, with the first component thereof comprising the polymer (1) and the filler material (2), and the second component comprising the cross-linking agent (3), the catalyst (4) and the silane (5).

10. The RTV organopolysiloxane composition as defined by claim 1, further comprising an adjuvant (6) said adjuvant comprising an inorganic or organic pigment, or organosilicon polymers.

11. The RTV organopolysiloxane composition as defined by claim 1, in vulcanized state.

12. A shaped article comprising the RTV organopolysiloxane composition as defined by claim 11.

13. A substrate coated with the RTV organopolysiloxane composition as defined by claim 1.

14. A substrate coated with the RTV organopolysiloxane composition as defined by claim 11.

15. The RTV organopolysilane composition as defined by claim 1, wherein said at least one cross-linking agent (3) comprises an alkyltrialkoxysilane wherein the alkyl contains from 1 to 4 carbon atoms.

* * * * *